United States Patent
Kamen et al.

(10) Patent No.: US 8,171,510 B2
(45) Date of Patent: *May 1, 2012

(54) METHOD FOR USING BANNER ADVERTISEMENTS DURING COMMERCIAL BREAKS

(75) Inventors: Yakov Kamen, Cupertino, CA (US); Leon Shirman, Redwood City, CA (US)

(73) Assignee: JLB Ventures LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/841,287

(22) Filed: Jul. 22, 2010

(65) Prior Publication Data

US 2010/0287581 A1 Nov. 11, 2010

Related U.S. Application Data

(63) Continuation of application No. 09/449,016, filed on Nov. 24, 1999, now Pat. No. 7,779,436.

(51) Int. Cl.
*H04N 7/16* (2006.01)
*H04N 7/10* (2006.01)
*H04N 7/025* (2006.01)
*H04N 7/173* (2006.01)
*H04H 60/33* (2008.01)
*H04H 60/56* (2008.01)
*G06Q 30/00* (2012.01)

(52) U.S. Cl. ............ 725/32; 725/12; 725/131; 725/136; 705/14.4

(58) Field of Classification Search ........................ None
See application file for complete search history.

(56) References Cited

U.S. PATENT DOCUMENTS 4,918,531 A * 4/1990 Johnson ........................ 348/565
(Continued)

FOREIGN PATENT DOCUMENTS

DE 19806977 A1 8/1999
(Continued)

OTHER PUBLICATIONS

EP Application No. 10181429, European Search Report, dated Nov. 4, 2010.

(Continued)

*Primary Examiner* — Mark D Featherstone
(74) *Attorney, Agent, or Firm* — Banner & Witcoff, Ltd.

(57) ABSTRACT

Apparatus is provided by which a television viewer can view other images e.g. during commercials or main program. For example, during a commercial, a viewer may channel surf or surf the internet. A banner is provided on a viewing screen while the viewer watches these other images. In this way the advertiser providing those commercials can still reach those viewers who are channel or internet surfing. Also, the banner will indicate to the viewer when the commercial is over and the normal programming has resumed. In another embodiment, during the main program user can activate one or more small commercial windows and position them on the screen based on his preference, e.g. using a remote device. Information is communicated to a broadcaster by the viewer's video system indicating the above-mentioned commercial windows are open on the viewer's screen. When each commercial window is positioned on the screen the viewer receives compensation based on the amount of time the commercial windows are displaying commercials to the viewer. All or part of commercial windows automatically close when a main commercial block starts. The commercial windows automatically open when the main commercial block finishes. In one embodiment, the viewer can turn the commercial windows ON/OFF on his discretion.

11 Claims, 3 Drawing Sheets

U.S. PATENT DOCUMENTS

| | | | |
|---|---|---|---|
| 5,526,034 | A | 6/1996 | Hoarty et al. |
| 5,550,578 | A | 8/1996 | Hoarty et al. |
| 5,610,653 | A * | 3/1997 | Abecassis .................... 348/170 |
| 5,729,279 | A * | 3/1998 | Fuller ............................. 725/74 |
| 5,796,952 | A | 8/1998 | Davis et al. |
| 5,818,441 | A | 10/1998 | Throckmorton et al. |
| 5,855,008 | A | 12/1998 | Goldhaber et al. |
| 5,929,849 | A | 7/1999 | Kikinis |
| 5,929,850 | A | 7/1999 | Broadwin et al. |
| 5,973,723 | A | 10/1999 | DeLuca |
| 5,982,445 | A | 11/1999 | Eyer et al. |
| 6,034,678 | A | 3/2000 | Hoarty et al. |
| 6,064,376 | A | 5/2000 | Berezowski et al. |
| 6,084,628 | A | 7/2000 | Sawyer |
| 6,100,883 | A | 8/2000 | Hoarty |
| 6,133,912 | A | 10/2000 | Montero |
| 6,138,155 | A | 10/2000 | Davis et al. |
| 6,157,814 | A | 12/2000 | Hymel et al. |
| 6,167,235 | A | 12/2000 | Sibecas et al. |
| 6,169,542 | B1 | 1/2001 | Hooks et al. |
| 6,177,931 | B1 | 1/2001 | Alexander et al. |
| 6,182,050 | B1 | 1/2001 | Ballard |
| 6,184,878 | B1 | 2/2001 | Alonso et al. |
| 6,188,398 | B1 | 2/2001 | Collins-Rector et al. |
| 6,205,582 | B1 | 3/2001 | Hoarty |
| 6,240,555 | B1 | 5/2001 | Shoff et al. |
| 6,263,507 | B1 | 7/2001 | Ahmad et al. |
| 6,505,348 | B1 | 1/2003 | Knowles et al. |
| 6,522,342 | B1 | 2/2003 | Gagnon et al. |
| 6,563,515 | B1 | 5/2003 | Reynolds et al. |
| 6,681,393 | B1 | 1/2004 | Bauminger et al. |
| 6,934,963 | B1 | 8/2005 | Reynolds et al. |
| 2003/0117527 | A1 | 6/2003 | Smith |
| 2005/0283800 | A1 | 12/2005 | Ellis et al. |

FOREIGN PATENT DOCUMENTS

| | | |
|---|---|---|
| EP | A0384388 | 8/1990 |
| EP | 0869423 | 10/1998 |
| EP | A0901284 | 3/1999 |
| JP | 60-176373 | 9/1985 |
| WO | 9736424 | 10/1997 |
| WO | 9740447 | 10/1997 |
| WO | 9835468 | 8/1998 |
| WO | 9917549 A | 4/1999 |
| WO | 9929109 | 6/1999 |
| WO | 9945702 A | 7/1999 |
| WO | 9949390 | 9/1999 |
| WO | 9956473 | 11/1999 |

OTHER PUBLICATIONS

EP Application No. 10181346, European Search Report, dated Oct. 27, 2010.

EP Application No. 10181419, European Search Report, dated Nov. 2, 2010.

EP Application No. 10181411, European Search Report, dated Oct. 29, 2010.

European Office Communication for EP 00978601.3.

Provision of the minutes of oral proceeding issued in corresponding European Patent Application No. 00 978 601.3. dated Oct. 27, 2011.

* cited by examiner

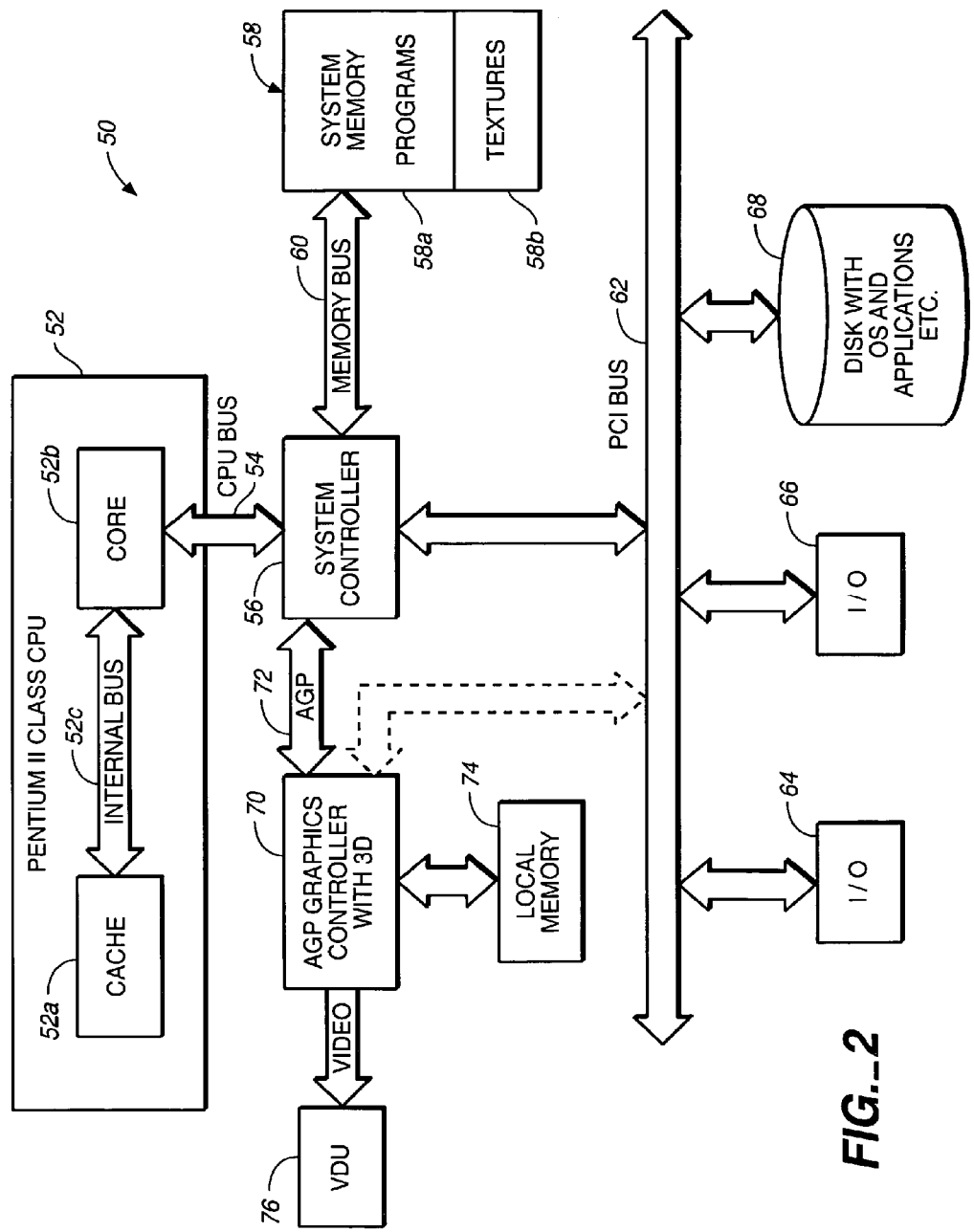
FIG._2

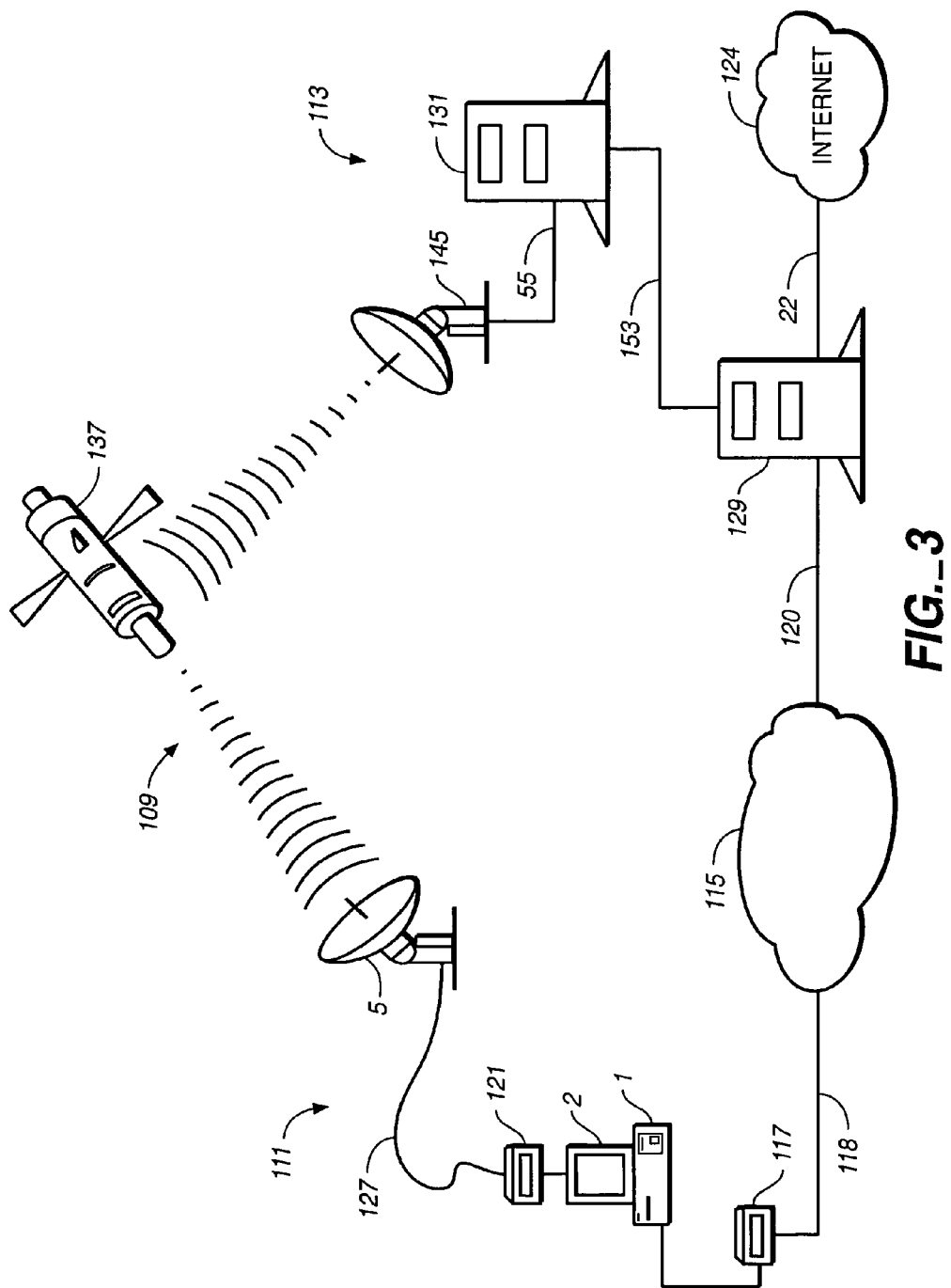

METHOD FOR USING BANNER ADVERTISEMENTS DURING COMMERCIAL BREAKS

CROSS-REFERENCE TO RELATED APPLICATIONS

This application is a continuation of co-pending application Ser. No. 09/449,016, filed Nov. 24, 1999 and entitled "Method for Using Banner Advertisements During Commercial Breaks." The content of the above application is hereby incorporated by reference in its entirety.

BACKGROUND OF THE INVENTION

Present techniques for providing television commercials have several weaknesses. During television commercials, viewers very often change channels. Unfortunately, this means that the advertiser who is paying to provide the commercials loses its ability to try to sell products to the viewer. This also provides a disadvantage to the viewer, because the program may resume while he is watching something else on the video screen.

Commercials use 100% of the television screen space. This means that commercials can only be shown as interruptions of a TV program. The total time duration of such interruptions are regulated. This defines a potential cap on advertisement revenue. The viewer cannot choose to avoid viewing commercials unless he or she changes the channel, in which case he or she may miss portions of the main program. Television viewers consider commercials to be an unavoidable payment for watching television programs. It would be desirable to provide a video system in which the advertiser can still appeal to viewers, while permitting viewers to change channels or use their video systems for other purposes, e.g. web surfing or any other unrelated viewing.

SUMMARY

A video system in accordance with one embodiment of the invention permits an advertiser to provide advertisements in the form of a window or banner on a television screen. In one embodiment, unlike conventional television commercials, the window or banner can be present during a main program. Also, in one embodiment, unlike conventional television commercials, the banner or window can be provided on the viewer's television screen even if the viewer changes the channel or uses his television screen to perform other tasks, e.g. web browse. Accordingly, rather than loosing the viewer completely, the advertiser can continue to try to appeal to the viewer. Also, while browsing, the viewer can follow what is occurring during the broadcast so that he or she knows when the commercials are over.

In one embodiment, a special timed banner advertisement can be placed on a regular web page, thus gaining advertising space, and notifying the viewer when the normal program resumes. This notification can be provided in a special field, e.g. in the form of a countdown indicating when the normal program is to resume.

In accordance with another aspect of the invention, one or more advertisement windows (typically small windows) are shown on the video screen during a main program. In one embodiment, the location and appearance of these windows can be controlled by the viewer, e.g. using remote control. Thus, the video system of this embodiment permits a broadcaster (or other video data owner) to generate additional revenue for the advertiser by adding commercial material during the main program time. This is in contrast to presently existing commercials, which occupy the entire television screen, and therefore can only be shown during commercial breaks.

A video system in accordance with another embodiment of the invention includes a "no overlapping mechanism, during which commercial windows are automatically closed so that a regular full-screen commercial can be shown.

In accordance with another aspect of the invention, information is communicated to the broadcaster indicating whether the viewer continues to leave the above-mentioned banners or small windows open on the screen. This information can be sent back to the broadcaster via a wide area network ("WAN") to which the video system is connected. (The WAN can be the internet.) The broadcaster maintains a file that tracks this information. The viewer can be compensated for displaying the advertisement windows on top of the main program. This compensation can be in the form of money or discounts for products purchased from the advertiser. This compensation can be used to entice viewers to watch commercials that they would otherwise avoid.

In addition to gathering data concerning the turning on and off of commercial banners by viewers, a video system in accordance with the invention permits a broadcaster to gather statistical data about main program popularity.

In one embodiment, the video system of the present invention is assigned an electronic address. The broadcaster can direct certain advertising banners to specific video systems by communicating the banners to systems having specific addresses. In one example of this embodiment, the broadcaster can direct advertising banners to video systems known to be in a particular geographic location, e.g. a particular town. Thus, a video system in accordance with this embodiment permits the broadcaster to provide advertisements in small localities, e.g. a particular neighborhood. This permits small businesses to buy advertising time during television programs that would otherwise be uneconomical and poorly targeted to the advertiser's potential customers. This also permits the broadcaster to increase its advertising revenue by permitting many different small or local businesses to advertise during broadcasts. In particular, each business can provide advertisements to a different locality during a television program. Thus, small businesses, (rather than larger companies) can afford to advertise during broadcasts.

A video system in accordance with the invention also permits an advertiser to design special commercials targeted for customers with specific interests. Thus, if the broadcaster has a database indicating certain preferences of viewers, the broadcaster can provide advertising banners to specific video systems known to be owned by people having specific interests, e.g. an interest in certain sports, types of food or certain types of cultural events.

BRIEF DESCRIPTION OF THE DRAWINGS

FIG. 2 is a block diagram illustrating a video system in accordance with the invention.

FIG. 3 is a simplified block diagram of a broadcast system in accordance with the present invention, showing an exemplary set up for timing the overlays.

DETAILED DESCRIPTION

Figure 1:
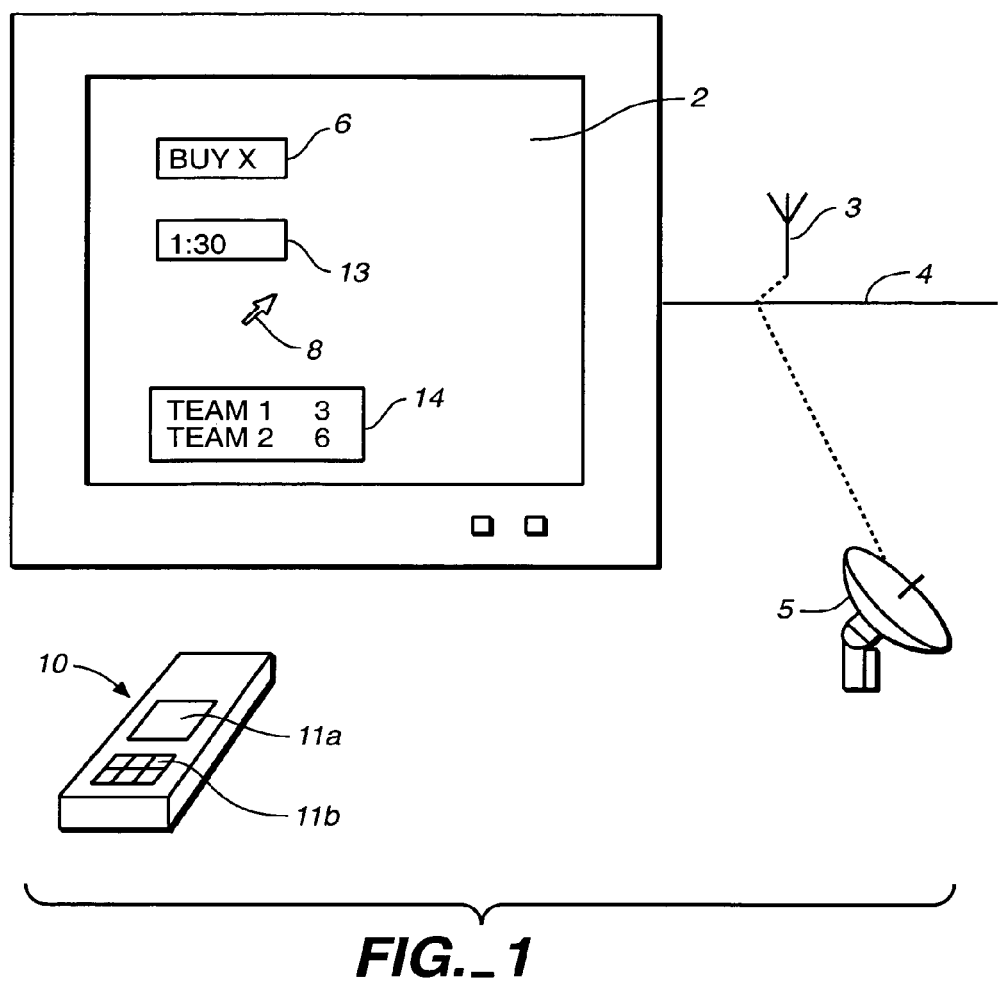
FIG. 1 illustrates a video screen displaying information with first and second overlay windows for displaying information relating to a video broadcast.

Referring to FIG. 1, a video system 1 comprises a video screen 2 that displays video information. Screen 2 can be a CRT screen, a LCD screen, a video projection screen, or other type of screen capable of displaying a visual image. In one embodiment, the video screen can operate in a mode in which it displays a conventional television program, either obtained from an antenna 3, a cable 4 or a satellite dish 5. The television program can be broadcast using NTSC, PAL, SECAM, or other analog or digital television picture communication standard, including but not limited to such as the newly emerging HDTV standards.

From time to time, commercials are inserted into the television broadcast, and many viewers use this as an opportunity to switch channels, or use the video system for other purposes, e.g. to surf the internet or watch video information from another source. However, viewers frequently want to know when the commercials are over. Accordingly, video system 1 displays a banner 6 providing an indication of what is being broadcast. For example, if a commercial for a product is being broadcast, banner 6 reflects or contains information pertaining to that product. This accomplishes two purposes. First, the viewer has an indication of when the commercial is over. When the commercial terminates, he can change back to the program he was viewing. Second, although the viewer is no longer watching the full commercial, the advertiser can still advertise its message to the viewer within banner 6. Additionally, the sound of both contents may he mixed to allow the user to follow both, or alternatively, the user can select which sound to hear.

Frequently, one commercial in a video broadcast is followed by another commercial. Accordingly, as the commercials change, banner 6 changes to reflect the currently broadcast commercial. Thus, each advertiser sponsoring a portion of the broadcast will be able to use banner 6 to advertise its products or services.

In one embodiment, banner 6 is associated with a link. In other words, a user can click on banner 6, and this will cause the video system to invoke that link. In one embodiment, the link is to an internet web page. In another embodiment, the link is to a source of information other than an internet web page. For example, the link can be to a page of data provided to video system 1 by the broadcaster of the program. In another embodiment, clicking on the banner will cause video system 1 to revert back to the video program.

The image contained in banner 6 is typically provided as part of the television broadcast signal received by video system I. Data corresponding to banner 6 can be inserted into a portion of the television signal not otherwise used, e.g. one of the retrace or blanking intervals. Since banner 6 is does not display large moving video images, the bandwidth requirements for broadcasting banner 6 are minimal.

In one embodiment, the location and size of the banner on the video screen is also communicated to video system 1 as part of the video signal. However, in other embodiments, the location and size of the banner is not communicated as part of the video signal.

As mentioned above, typically banner 6 is associated with a link, e.g. a URL link to a web page. Thus, if the advertisement associated with the banner is actually of interest to a viewer, he or she can click on the banner. The link information (i.e. the web page URL) can also be communicated as part of the video signal, e.g. during one of the retrace or blanking intervals of the video signal. The web page can contain further details concerning goods and services being advertised, or even permit the user to purchase the goods and services while accessing the web page. In lieu of a URL link, the link can be to a software routine that executes a function, e.g. dialing a telephone to enable a viewer to order merchandise or some other task.

The banner and link information can be updated from time to time, e.g. as the commercials change.

Also shown on screen 2 is a cursor 8. Cursor 8 can be any shape, or have any appearance. A user manipulates cursor 8 with a control device, e.g. a remote controller 10 comprising a joystick, trackball, mouse, touch pad (e.g. touch pad 11a) or appropriate control buttons 11b. If a user moves cursor 8 to banner 6, a link is invoked corresponding to banner 6. In one embodiment, the link is to a web page. Moving the cursor to banner 6 invokes the link, and information corresponding to the web page is displayed on screen 2. (In an alternative embodiment, one must move cursor 8 to banner 6 and click on banner 6 to invoke the link, rather than merely moving cursor 8 to banner 6.)

In another embodiment, the link is to a data source other than a web page. This data source could be another source of visual information, e.g. another movie or television program, e.g. being broadcast from a RF or cable source. Alternatively, the link could execute application software. Alternatively, the link could result in the display of data from a local data source, e.g. a disk drive, or a non-local data source.

In one embodiment, a second banner 13 is provided on video screen 2 that provides a count indicating how long it will be before the commercial is over. This enables a viewer to determine what tasks he or she has time to perform before programming resumes. The information in second banner 13 is communicated, e.g. during one of the above-mentioned retrace or blanking intervals of the television signal. In one embodiment, the time shown in banner 13 is updated from time to time by the broadcaster. In another embodiment, an initial time is provided to video system 1, and a processor within video system 1 counts down from an initial time communicated as part of the video signal.

Also shown in FIG. 1 is a third banner 14. For the case of a sporting event, third banner 14 can be game statistics, e.g. the score of a sporting event or other statistics. For example, for the case of a football game, the statistics might be the position of a ball on a football field, the amount of time left in a quarter, etc.

While the above-mentioned set of banners can be provided during a commercial, in an alternate embodiment, the banners can be provided during different types of programming intervals. For example, during half time a football game, or between periods in an ice hockey game, a viewer may want to web surf or change channels. The above-mentioned banners can keep the viewer apprised of what is being shown in the main broadcast, so he or she can return to the main broadcast if the half time show is over, or some other interesting event is about to commence.

When web surfing, the viewer can choose to look at web pages that are related or unrelated to the program being watched. If the viewer clicks on the advertising banner, in one embodiment, he is directed toward a web page of one or more local merchants, offering products or services such as pizza delivery. Alternatively, the viewer can be directed toward web pages offering products and services of particular interest viewers of the main program, such as NFL clothing and NFL memorabilia.

To partially summarize, a method in accordance with our invention allows a broadcaster to provide advertisements and services even if a viewer changes the channel or uses his or her video screen for other purposes. This is accomplished by means of the above-mentioned banner or window that provides those advertisements and links for accessing more information concerning the advertised goods and services, or links which permit the user to purchase those goods and services. In one embodiment, it is left to the viewer if he allows the users to turn off those banners or not.

In one embodiment, banner 6 does not contain any moving images. Alternatively, in lieu of a simple banner, a "thumbnail" commercial (i.e. a commercial in a small window region on the screen) may be shown. In yet another embodiment, several small advertising banners can be shown on screen 2. In yet another embodiment, banner 6 can be divided into a set of segments, each segment bearing a symbol that can be clicked on. For example, one symbol might represent a pizza, and a user could click on that symbol to order a pizza from a local vendor, whereas another segment might link the user to a page listing times for other television programs to be shown.

Description of One Embodiment of Video System 1

One embodiment of our invention can be practiced using a PC having the following:
1. A CPU such as a Celeron or Pentium e.g. as manufactured by Intel, or a K61K7 processor, e.g. as manufactured by Advanced Micro Devices.
2. 24 MB of memory or greater.
3. The operating system can be Windows 95, Windows 98, WinCE or Win2000.

FIG. 2 is a block diagram of a computer system 50 within video system 1 in accordance with our invention. Referring to FIG. 2, system 50 comprises a CPU 52, e.g. a Pentium II class CPU, comprising a cache memory 52a, a core 52b and an internal bus 52e for facilitating communication between core 52b and cache 52a. Core 52b communicates via a CPU bus 54 to a system controller 56. System controller 56 communicates with the system memory 58 via a memory bus 60. System memory 58 includes a portion that stores system memory programs.

Also included in system 50 is a PC1 bus 62 for facilitating communication between system controller 56 and I/0 devices 64, 66 and disk drive 68. I/O device 64 can be any type of 110 device. In one embodiment, I/O device 66 is a video capture card with a driver. Data from the video capture card is either loaded by DMA (direct memory access) or by CPU 52 into a frame buffer, typically within main memory 58. However, the frame buffer may be in other memories within system 50.

Graphics controller 70 uses its own local memory 74 to generate and store pixel arrays to be displayed on a video display unit 76.

It is emphasized that system 50 is only one example of a system that performs a method in accordance with our invention. Other hardware can be used as well.

Stored within a memory within video display system 1 are the locations on screen 2 of banner 6. CPU 52 (or other logic hardware within system 1) determines whether cursor 8 has been moved to banner 6, i.e. by comparing the position of cursor 8 to the values stored in memory corresponding to the location of banner 6. (This memory can be memory 58 or another memory within the system.)

Description of the Broadcast System

FIG. 3 shows a broadcast network 109 and WAN 115 combination. Such systems are well known in the art, e.g. DirectPC™ or Direct DUO™ provided by Hughes Network Systems, Inc. etc. There is typically a broadcast end side 113, and a receiver side 111 including video system 1. Broadcast antenna 145, satellite 137 and satellite receiver antenna 5 form together the broadcast system, in this case a direct satellite system, but other types of broadcast systems, such as cable, RF wireless, and wireless cable (either digital or analog) can be used. The signal broadcast through the system can pass through different types of signal communication channels (e.g. cable, then satellite broadcasting, back to cable, etc.) before being received by the end viewer. However, for purposes of explanation, an embodiment in which the transmission/broadcast system 109 is a simple satellite system is shown in FIG. 3. Also, WAN 115 and broadcast system 109 need not be in one system, but in many cases they are actually not.

On the receiver side 111, the key components are broadcast receiver 121 (coupled to satellite dish 5 via a cable 127), network interface (modem) 117 and PC/viewing station/video system 1. Typically, the functions of these components can be partitioned differently. Thus, in some embodiments, rather than using a PC as a generic building block, the broadcast receiver 121, network interface 117 and PC/viewing station 119 are combined into a set-top box, that uses a regular TV as a display device. Network interface 117 is coupled to WAN 115, e.g. as shown schematically by line 118.

The two networks 115 and 124 can be of any type, such as a WAN, or in particular the internet (as shown at 124). Network 115 may in some cases be a generic network. In one embodiment, server 129 can insert data into the broadcast stream via its link 153 to uplink server 131, or server 129 can send time sensitive signals via links 118, 120 and WAN 115 directly to client system 119. (Uplink server 131 provides the video signal to antenna 145 via cable 155.)

In the above-discussed embodiment, the commercials and banners are broadcast to all viewers. However, in another embodiment, specific advertising banners are provided to selected viewers based, for example, on the location of the viewer. For example, advertisements for a particular business may be provided only to viewers near that business. This can be accomplished in any of several ways. For example, in one embodiment, the banners are provided by the broadcaster via WAN 115 to viewers based on the viewers' WAN address. In such an embodiment, each video system 1 has an electronic address. Server 129 has a file listing the addresses of video systems within a particular locality, e.g. a particular town. Thus, advertisements for a store in a particular town can he directed to viewers in that town via WAN 115. A file a memory accessible by server 129 lists the WAN addresses of the viewers in that town, and server 129 transmits banners for that store only to the viewers in that town via WAN 115. System 1 receives and stores the banner information and displays it on screen 2 as banner 6. Server 129 can also provide link addresses (e.g. URLs or other WAN addresses) associated with those banners so that if the viewers click on the banner, they will be directed toward a web page provided by that store.

In an alternate embodiment, server 129 can have a database indicating specific interests of different viewers and the address of their video system 1. In this alternate embodiment, server 129 broadcasts to a specific set of addresses advertising information that is expected to be of interest to viewers at those addresses. For example, if the database accessed by server 129 indicates that a certain set of viewers are interested in football, server 129 provides banner advertisements that would be of interest to football fans. If the database indicates that another set of viewers are interested in movies server 129 provides banner advertisements that would be of interest to movie fans.

In an alternative embodiment, information concerning banner 6 is broadcast via satellite 137 to all viewers along with address information indicating which viewing systems should display that particular banner.

As mentioned above, in one embodiment, banner 6 is turned off at certain times to permit the showing of a full screen commercial (or for other purposes). This can be accomplished in one of several ways. For example, the broadcast system can simply cease sending a signal containing banner 6. Alternatively, the broadcast system can send a signal (either embedded within the video signal provided by satellite 137 or via WAN 115) instructing video system 1 to turn off banner 6.

As mentioned above, in one embodiment the viewer has the option of turning advertising banner 6 on or off. In one version of this embodiment, system 1 communicates to server 129 via WAN 115 whether or not a given viewer is keeping banner 6 on. Server 129 keeps track of this information. A broadcaster or advertiser can encourage viewers to keep the banners on by offering various enticements or forms of compensation to viewers who keep banner 6 on. One type of enticement might be monetary, e.g. in the form of payments to the viewer, discounts if the viewer purchases items advertised by video system 1, or discounts in the viewers cable TV subscription.

While the invention has been described with respect to specific embodiments, those skilled in the art will appreciate that changes can be made in form and detail without departing from the spirit and scope of the invention. For example, any type of display screen can be used in conjunction with the invention. For example, projection video display screens, LCDs, CRTs or other types of display devices can be used. Similarly, different types of networks or communications media can he used to exchange information between the advertiser and viewer, e.g. optical or electrical cables, phone lines, etc.

The information contained in banner 6 can either be received in a television signal or via a network such as WAN 115. In the case in which banner 6 is received in a television signal, video system 1 can contain two tuners so that two television signals can be received simultaneously—one containing the signal including banner 6 and the other containing a program that is currently being watched.

We claim:

1. A method comprising:
   broadcasting, by a content provider system, a first video program signal to client equipment located remotely from the content provider system, the first video program signal comprising an advertisement;
   receiving a request to change the first video program signal to a second video program signal;
   in response to receiving the request, providing additional signal information to the client equipment, wherein the additional signal information is representative of the advertisement being displayed in a window on a display simultaneously with the second video program signal, wherein display of the additional signal information changes at an end of the advertisement to indicate that the advertisement has ended; and
   receiving, from the client equipment, data indicating whether the window is enabled or disabled on the client equipment.

2. The method of claim 1 wherein the additional signal information to be displayed is included in a portion of a video signal that does not normally include visual information.

3. The method of claim 1, further comprising:
   providing compensation to a viewer based on the data relating to whether the window is enabled or disabled by the viewer.

4. The method of claim 1, further comprising:
   determining that a viewer has requested the window be disabled; and
   in response, ceasing transmission of a signal including the window to the client equipment.

5. The method of claim 2 wherein the portion of the video signal comprises a retrace interval or a blanking interval.

6. One or more non-transitory computer readable media storing computer readable instructions that, when executed, cause an apparatus to:
   broadcast a first video program signal to client equipment located remotely from the apparatus, the first video program signal comprising an advertisement;
   receive a request to change the first video program signal to a second video program signal;
   in response to receiving the request, provide additional signal information to the client equipment, wherein the additional signal information is representative of the advertisement being displayed in a window on a display simultaneously with the second video program signal, wherein display of the additional signal information changes at an end of the advertisement to indicate that the advertisement has ended; and
   receive data indicating whether the window is enabled or disabled on the client equipment.

7. The one or more non-transitory computer readable media of claim 6, further comprising computer readable instructions that, when executed, cause the apparatus to:
   provide compensation to a viewer based on the data relating to whether the window is enabled or disabled by the viewer.

8. The one or more non-transitory computer readable media of claim 6, further comprising computer readable instructions that, when executed, cause the apparatus to:
   determine that a viewer has requested the window be disabled; and
   in response, cease transmission of a signal including the window to the client equipment.

9. An apparatus comprising:
   a processor; and
   memory operatively coupled to the processor and storing computer readable instructions that, when executed, cause the apparatus to:
   broadcast a first video program signal to client equipment located remotely from the apparatus, the first video program signal comprising an advertisement;
   receive a request to change the first video program signal to a second video program signal;
   in response to receiving the request, provide additional signal information to the client equipment, wherein the additional signal information is representative of the advertisement being displayed in a window on a display simultaneously with the second video program signal, wherein display of the additional signal information changes at an end of the advertisement to indicate that the advertisement has ended; and
   receive data indicating whether the window is enabled or disabled on the client equipment.

10. The apparatus of claim 9, the memory further comprising computer readable instructions that, when executed, cause the apparatus to:
    provide compensation to a viewer based on the data relating to whether the window is enabled or disabled by the viewer.

11. The apparatus of claim 9, the memory further comprising computer readable instructions that, when executed, cause the apparatus to:
    determine that a viewer has requested the window be disabled; and
    in response, cease transmission of a signal including the window to the client equipment.

* * * * *